United States Patent [19]

Davis et al.

[11] Patent Number: 6,002,876
[45] Date of Patent: Dec. 14, 1999

[54] MAINTAINING CODE CONSISTENCY AMONG PLURAL INSTRUCTION SETS VIA FUNCTION NAMING CONVENTION

[75] Inventors: Alan L. Davis, Sugar Land; Jonathan F. Humphreys, Missouri City; Reid E. Tatge, Richmond, all of Tex.

[73] Assignee: Texas Instruments Incorporated, Dallas, Tex.

[21] Appl. No.: 08/938,276

[22] Filed: Sep. 26, 1997

Related U.S. Application Data

[60] Provisional application No. 60/026,841, Sep. 27, 1996.

[51] Int. Cl.$^6$ .................................................. G06F 9/445
[52] U.S. Cl. ......................... 395/710; 395/708; 395/709; 395/712
[58] Field of Search ................................... 395/709, 710, 395/712

[56] References Cited

U.S. PATENT DOCUMENTS

| | | | |
|---|---|---|---|
| 4,870,614 | 9/1989 | Quatse | 364/900 |
| 5,159,687 | 10/1992 | Richburg | 395/702 |
| 5,303,358 | 4/1994 | Baum | 395/375 |
| 5,488,573 | 1/1996 | Brown et al. | 395/500.42 |
| 5,572,666 | 11/1996 | Whitman | 714/32 |
| 5,619,665 | 4/1997 | Emma | 395/384 |
| 5,621,639 | 4/1997 | Fray | 364/191 |
| 5,625,567 | 4/1997 | Mankin et al. | 364/490 |
| 5,740,461 | 4/1998 | Jaggar | 395/800.41 |

OTHER PUBLICATIONS

Aho et al., "Compiler Principles, Techniques, and Tools", Addison–Wesley, pp. 1–19, Mar. 1988.

Bolychevsky et al., "Dynamic Scheduling in RISC Architectures", IEEE, pp. 309–317, Sep. 1996.

Quammen et al., "A RISC Architecture for Multitasking", IEEE, pp. 230–237, 1988.

Bunda et al., "16–bit vs 32–bit Instructions for Pipelined Microprocessors", ACM, pp. 237–246, 1993.

Huang et al., "Hardware/Software Resolution of Pipeline Hazards in Pipeline Synthesis of Instruction Set Processors", ACM, pp. 594–599, 1993.

Miller et al., "A Model for Dataflow based vector execution", ACM, pp. 11–22, 1994.

*Primary Examiner*—Tariq R. Hafiz
*Assistant Examiner*—Ted T. Vo
*Attorney, Agent, or Firm*—Robert D. Marshall, Jr.; Gerald E. Laws; Richard L. Donaldson

[57] ABSTRACT

A method of producing a computer program for a computer capable of operating in a plurality of disjoint instruction sets. The method produces a plurality of independently callable functions. For each function the method determines a target instruction set employed by the function. The method provides the function with a name corresponding to the target instruction set. The function name is preferably a modification of a user provided function name corresponding to the target instruction set. The method identifies each call of another independent function and provides each with a name corresponding to the target instruction set. The method produces a veneer function for each function and for each other instruction set. The veneer functions include changing the computer from operating in the other instruction set to operating in the target instruction set, calling the corresponding function, changing the computer to operate in the other instruction set, and a return command. Each veneer function is provided with a name corresponding to the other instruction set. Each function and its corresponding veneer functions are converted into a linkable object code module and then linked into an executable object code file of the computer program. The linker preferably omits from the executable object code file any veneer functions not called by a function.

25 Claims, 2 Drawing Sheets

MAINTAINING CODE CONSISTENCY AMONG PLURAL INSTRUCTION SETS VIA FUNCTION NAMING CONVENTION

This application claims priority under 35 U.S.C. 119(e) (1) of provisional application number 60/026,841 filed Sep. 27, 1996.

TECHNICAL FIELD OF THE INVENTION

The technical field of this invention is that of program compilers and particularly program compilers for computers capable of operating under plural disjoint instruction sets.

BACKGROUND OF THE INVENTION

Some microprocessors support multiple, disjoint instruction sets which can be selected or changed during program execution. When using such a microprocessor, the program development tools, such as a compiler, assembler, linker, debugger, must manage the state of the processor. These program development tools must track and control which instruction set should be employed at each point in the program.

The version 7 of an ARM microprocessor is capable of executing in either of two disjoint instruction sets. The first instruction set is called the ARM instruction set. All ARM instructions are 32 bits in length. This was the original instruction set for the family of microprocessors. The 32 bit instructions permit coding many functions as well as enabling specification of two source registers and a destination register. The ARM instruction set is constructed according to the reduced instruction set computer (RISC) model. Instruction sets employing the RISC model are generally known for their speed of computation due to reduced decode complexity and simplified operation model. The second instruction set is called the THUMB instruction set. All THUMB instructions are 16 bits in length. The THUMB instruction set is a subset of the ARM instruction set. During the decode phase the microprocessor transforms each THUMB instruction into the corresponding ARM instruction. Operations coded in the THUMB instruction set generally operate more slowly than equivalent operations coded in the ARM instruction set. This is due to the additional decode processing and the limitations of the less rich set of instructions. However, functions coded in the THUMB instruction set generally require less program memory than equivalent functions coded in the ARM instruction set. The reduced length of the THUMB instructions relative to the ARM instructions produces this result. This is advantageous especially for portable embedded processors which may have limited memory space. The ARM microprocessor has two states: the ARM state, in which it executes only ARM instructions; and the THUMB state, in which it executes only THUMB instructions. Both instruction sets contain an instruction which changes the microprocessor to the other state.

The process of changing between the ARM and THUMB states is expensive in time. The ARM microprocessor is pipelined, that is, portions of plural instructions are executing in different hardware at the same time. Thus the microprocessor may fetch one instruction, decode an earlier instruction, execute a yet earlier instruction and store the results of a still earlier instruction. Upon changing from one state to another, all later instructions in the instruction pipeline are in the wrong instruction set. Thus the instruction pipeline must be flushed and reloaded. This process idles and wastes computational resources which could otherwise have been devoted to performing the flushed instructions. As a result, the accepted practice changes states only on function entry and exit. Therefore, any particular function is either entirely coded in ARM-state instructions or in THUMB-state instructions.

In a typical application, it is desirable to have some functions compiled in ARM state and other functions compiled in THUMB state. For example, some time critical operations and often used inner loops would be coded in the faster ARM instruction set. Other operations which are not time critical would be coded in the THUMB instruction set. This would result in a generally smaller program code size with little speed degradation. The decision of how to compile a particular function is typically decided by the programmer. In such a program, the compiler must generate code for a function in one state which may be called by code in the other state. The compiler must also generate code for a call to a function with an unknown state to support separate function compilation.

In the prior art the general solution is to generate veneer functions for each function. A veneer function manages the state change when the function is called by code in the other state. To illustrate, for an ARM-state function called "xyz", we would have the following veneer function:

| xyz_veneer: | |
|---|---|
| <change to ARM state> | THUMB instruction(s) |
| call xyz | ARM instruction |
| <change to THUMB state> | ARM instruction(s) |
| <return to caller> | THUMB instruction |

In this example, calls to "xyz" from THUMB-state code would generate a call to "xyz_veneer." The "xyz_veneer" function changes to the ARM-state, calls "xyz", restores the THUMB-state, and returns to the caller. ARM-state code may call "xyz" directly. The reverse occurs for a THUMB-state function "uvw":

| uvw_veneer: | |
|---|---|
| <change to THUMB state> | ARM instruction(s) |
| call uvw | THUMB instruction |
| <change to ARM state> | THUMB instruction(s) |
| <return to caller> | ARM instruction |

In this case, all calls to function "uvw" from ARM-state code would generate a call to "uvw_veneer". THUMB-state code would call "uvw" directly.

This procedure presents a problem to the development tools. The development tools must determine when veneers are needed for a function. Producing unneeded veneers in the object code would needlessly increase the code size. The development tools must insert the veneers as required. Finally, the development tools must rewrite all calls which require a state change to call the corresponding veneers. Ideally this process should be seamless and transparent to the user programmer.

The prior approach to this problem uses the linker during the final link. The linker first reads all the object code functions. The linker then identifies the compiled code state of each function. The linker next determines for each function if it is ever called by a function which is compiled in the opposite state. For each such function, the linker must generate a corresponding veneer. For an ARM-state function, the linker generates a THUMB-state veneer. For a THUMB-state function, the linker generates an ARM-state veneer. The linker determines for each call instruction for code for either state if the destination of the call is compiled in the opposite state of the call instruction. If so, the linker must rewrite the call instruction to call the corresponding veneer.

There are several difficulties with this prior art approach. The linker must identify the object code associated with each function and the state in which it is compiled. The linker needs to be able to generate or modify instructions. Providing these capabilities is a major disadvantageous complication for a target-independent linker. These tasks are not particularly complex. However, these tasks are not normally within the scope of what a linker is expected to do. Accordingly, providing these additional capabilities to a linker presents major problems.

SUMMARY OF THE INVENTION

This invention is a method of producing a computer program for a computer capable of operating in a plurality of disjoint instruction sets. The method produces a plurality of independently callable functions. For each function the method determines a target instruction set employed by the function. The method provides the function with a name corresponding to the target instruction set. In the preferred embodiment, the function name is a modification of a user provided function name. This modification corresponds to the target instruction set employed by the function. The modification could be provision of a prefix, suffix or infix corresponding to the target instruction set.

The method identifies within the function each call of another independent function. The method provides each such identified call with a name corresponding to the target instruction set of the function. These names are preferably provided by modification of a user provided name in the same manner as naming the function.

The method produces a veneer function for each function and for each other instruction set. The veneer functions include changing the computer from operating in the other instruction set to operating in the target instruction set of said corresponding function, calling the corresponding function, changing the computer to operate in the other instruction set, and a return command in the other instruction set. Each veneer function is provided with a name corresponding to the other instruction set, which is preferably a modification of the original function name.

Each function and its corresponding veneer function are converted into linkable object code files. This could be by compiling a high level language source code or by assembling an assembly language source code. Lastly, the linkable object code files are linked into an executable object code file of the computer program. The linker preferably omits from the executable object code file any veneer functions not called by a function.

This technique takes advantage of the normal operations of parts of the program development suite. All code generation for veneer functions are handled by the compiler or assembler, which normally provide code generation. All handling of the naming convention is by modification of an unconstrained user provided name. Thus the operation is transparent to the programmer. Lastly, the linker operation does not require functions not normally required of a linker.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
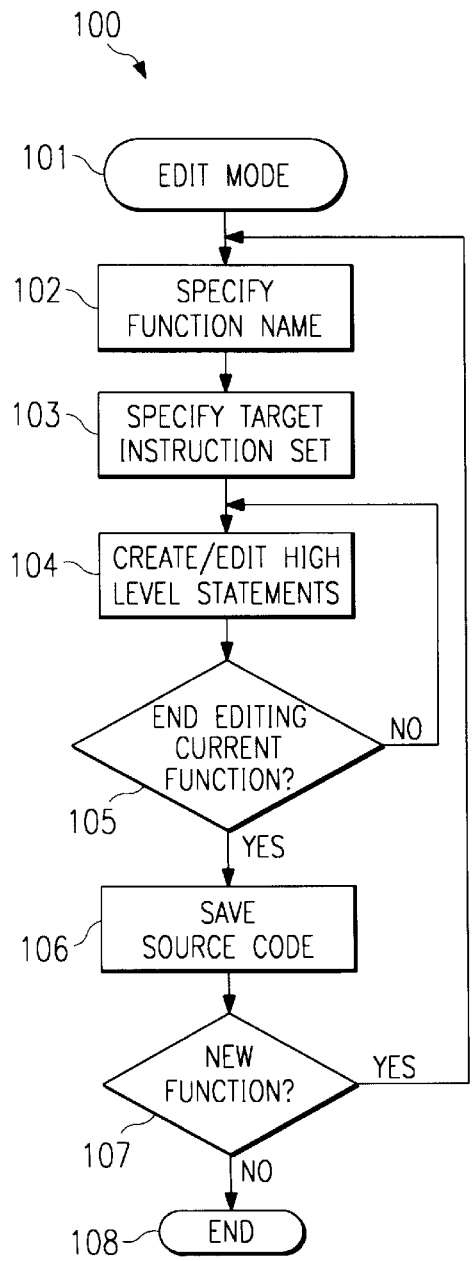
FIG. 1 illustrates in flow chart form the process of editing source code files.

This invention provides a advantageous manner for controlling function calls in a computer which supports multiple, disjoint instruction sets. This invention employs separate compiler and linker using the unique strengths of each. It is transparent to the programmer because it does not require any additional effort on the part of the programmer in order to operate effectively.

The typical suite of development tools includes a compiler, an assembler and a linker. The compiler takes source code generated in a high level programming language plus compiler directives specified by the programmer and generates independent functions of object code in the target instruction set of the computer. The assembler permits the programmer to specify the exact instructions in the target instruction set of the computer employing user mnemonics. In a typical program the programmer would employ the assembler only for functions having critical design restrictions of run time operation or code size. It is generally believed that assembled programs can be faster and employ less program memory than compiled programs. However, it requires a higher level of programming expertise to program with an assembler than with a compiler. The linker takes object code functions generated by the compiler and the assembler, resolves calls between functions and forms the completed program. The linker employs the known length of each function and a determined order to resolve function calls by name into references by memory address. Some but not all linkers omit from the completed program any functions that are never called. This is helpful in many instances because it does not require program memory space for unused portions of program code.

This division between compiler/assembler and linker permits separate function compilation. The programmer is permitted to modify only a single function of the program or substitute a new function. The linker could link the program using the modified or substitute function without the need to recompile or reassemble other functions that are unchanged. Under this division of tasks the linker needs little information about the individual functions, only their name, their length and the identity of any external references. Thus a linker could be independent of the instruction set of computer. This permits the linker to be a very simple program.

In summary, the invention employs the compiler or assembler to generate veneers for each function and employs the linker to remove unused veneers. Code state consistency is maintained between functions through the use of a naming convention. In the following Figures the operation of editing, compiling, assembling and linking are discussed separately. This separate discussion of these aspects of program development is only illustrative. It is contemplated that program development could take place in a integrated environment integrating these plural functions and possible additional debugging functions into a single user program.

FIG. 1 illustrates the editing functions 100. The process of editing is substantially the same whether the source file is to be in a high level language for later compilation or in instruction mnemonics for latter assembly. Upon entering the EDIT mode (start block 101), editor allows the programmer to specify the name of a current program function (block 102). In the typical program development environment, the program name is specified by the name given to the top level function. As will be detailed below, the names given the program code functions are important to this invention. However, in the preferred embodiment the compiler and assembler automatically handle the naming convention of this application. No special action on the part of the programmer is necessary. Note that this process may include creation of a new function, if the programmer selects a new function name. Alternatively, this process may include recall for editing an existing function, it the programmer selects a name of a prior function.

The editor allows the programmer to specify the target instruction set of the current program function (block 103). This invention is for use with a computer operating under more than one independent instruction set. In a compiler environment this specification could be made by a compiler directive. In this case, the editor permits entry of the compiler directive into the source code. It is also feasible that the editor permits differing operations and enables differing tools dependent upon the selected instruction set. In an assembler environment, either the editor could be dedicated to a single instruction set or could permit operation in a selected one of the plural instruction sets and may permit differing operations and enable differing tools dependent upon the selected instruction set. It is also possible that the instruction set can be specified only at the time of compilation or assembly. In this case, the editor plays no part in this process and block 103 is omitted.

The editor next supports the programmer creating and editing the program function (block 104). In a compiler environment, this involves specification of the program functions in a high level language such as Ada, C, Fortran, Pascal, etc. The particular high level language is not important to this invention. It is contemplated that the programmer may specify functions called by the current function. In the prior art, programmers are generally able to freely assign names to these called functions. As will be further explained below, the names given the program code functions are important to this invention. However, in the preferred embodiment the compiler or the assembler automatically handles the naming convention of this application. No special action on the part of the programmer in naming called functions is necessary. In an assembler environment, this editing involves specification of the program function in the mnemonics for the target instruction set. This editing block 104 contemplates all the normal program editing functions known in the art.

The editor gives the programmer the opportunity to end editing the current function (decision block 105). If the programmer chooses not to end editing the current function, the editing process returns to block 104 to continue editing the current function. If the programmer chooses to end editing the current function (decision block 105), the source code of the current function is saved (block 106) by writing to a disk file in the same manner as the prior art.

If the programmer chooses to end editing the current function, the editor gives the programmer to an opportunity to create or edit another function (decision block 107). If the programmer chooses to work on another function, the editing process returns to processing block 102 for specification of the function name. This will be followed by specification of the target instruction set (block 103), editing the source code (block 104) and return to decision block 105. If the programmer chooses not to work on another function, the editing process is then complete and the EDIT mode terminates (end block 108).

Figure 2:
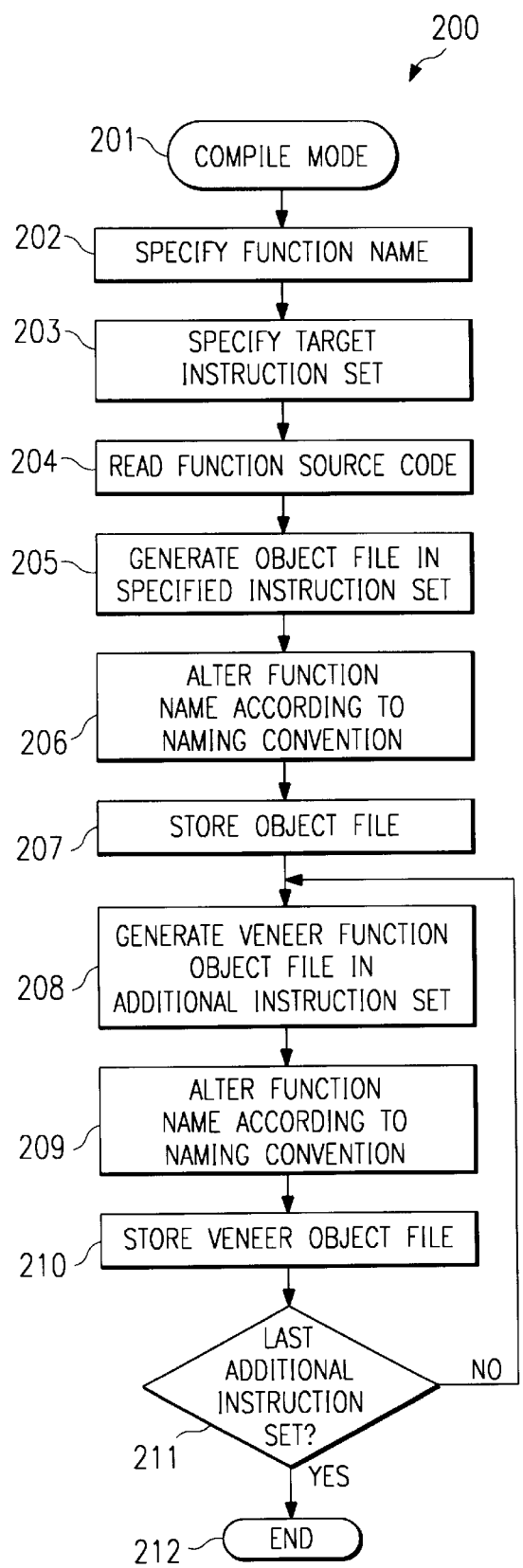
FIG. 2 illustrates in flow chart form the process of compiling in accordance with the invention.

FIG. 2 illustrates the function of the compiler 200. Upon entering the COMPILE MODE (start block 201), the programmer must specify the name of the program to be compiled (block 202). In the typical case, the name of the top level function is the name given to the program. The compiler accepts a specification of the target instruction set (block 203). In the preferred embodiment, the target instruction set is specified at compile time. This could be via the command line when the compiler is started. This could also be specified via an option selected after starting the compiler as shown in block 203. Lastly, it is feasible to specify the target instruction set via a compiler directive included in the source code of the function. In this case, specification of the target instruction set takes place only after reading the source code file. The compiler may optionally employ a default instruction set in the absence of a user choice. Regardless on the method, the compiler must be set to only one of the plural instruction sets. The compiler then reads the source code file corresponding to the program name specified by the programmer (block 204) from disk. The compiler then generates an object code file in the target instruction set (block 205). This process generally the same as known in the art. The compiler will name called functions according to a naming convention in a manner that will be explained below. The compiler then alters the name given to the function according to the naming convention (block 206), which will be explained below. The compiler then stores the object code file with the altered name (block 207) on disk.

The compiler then forms a corresponding veneer function (block 208) in the first additional instruction set. As noted above each veneer function includes: one or more commands to change the computer from operating in the additional instruction set to operating in the original instruction set; a call to the original function in the original instruction set; one or more commands to change the computer from operating in the original instruction set of the function to operating in the additional instruction set; and a return command in the additional instruction set. The compiler then alters the source code specified original function name according to the naming convention for the new instruction set (block 209). The compiler then stores an object code file of the veneer function (block 210) on disk.

The compiler then checks to determine if veneer functions are needed for another instruction set (decision block 211). In the preferred embodiment used with the version 7 of the ARM microprocessor, there are only two instruction sets. Thus there is no need for this decision block to loop for third and further instruction sets. However, the scope of the invention covers cases in which there are three or more distinct instruction sets. If there is a need for additional veneer functions for additional instruction sets, then the compiler loops back to block 208 to generate another veneer function. The compiler alters the user specified name according to the naming convention in the new instruction set (block 209) and stores a veneer object code file using the altered name (block 210) on disk. The process continues until a veneer function is created, renamed and stored for all additional instruction sets (decision block 211). The compiler then ends at end block 212.

Figure 3:
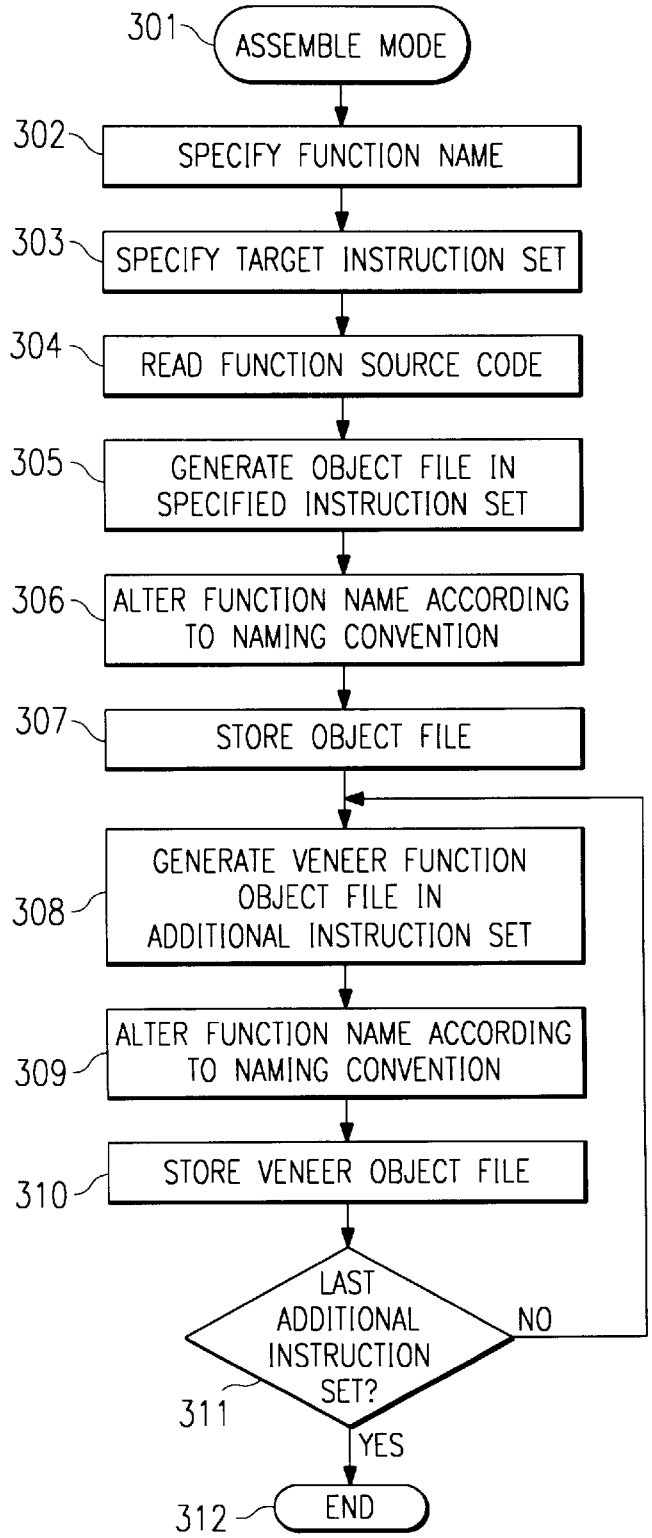
FIG. 3 illustrates in flow chart form the process of assembling in accordance with the invention.

FIG. 3 illustrates the function of the assembler 300. The ASSEMBLER mode 300 is very similar to the COMPILER mode 200. Upon entering the ASSEMBLER mode (start block 301), the programmer must specify the name of the function to be assembled (block 302). The compiler accepts a specification of the target instruction set (block 303). In the preferred embodiment, the target instruction set is specified at assemble time via the command line or an option selected after starting the assembler as shown in block 303. The target instruction set may be specified via an assembler directive, the mnemonics employed in the source file or as a default instruction set in the absence of a user choice. The assembler then reads the source file corresponding to the function name specified by the programmer (block 304). The assembler then generates an object code file in the specified instruction set (block 305). The assembler then alters the name given to the function according to the naming convention (block 306), which will be explained below. The assembler then stores the object code file with the altered name (block 307) on disk.

The assembler then forms a corresponding veneer function (block 308) in the first additional instruction set. As noted above each veneer function includes: one or more commands to change the computer from operating in the additional instruction set to operating in the original instruction set; a call to the original function in the original instruction set; one or more commands to change the computer from operating in the original instruction set of function to operating in the additional instruction set; and a return command in the additional instruction set. The assembler then alters the original function name according to the naming convention for the new instruction set (block 309). The assembler then stores an object code file of the veneer function (block 310) on disk.

The assembler then checks to determine if veneer functions are needed for another instruction set (decision block 311). If there is a need for additional veneer functions for additional instruction sets, then the assembler loops back to block 308 to generate another veneer function. The assembler alters the user specified name according to the naming convention in the new instruction set (block 309) and stores a veneer object code file using the altered name (block 310) on disk. The process continues until a veneer function is created, renamed and stored for all additional instruction sets (decision block 311). The assembler ends at end block 312.

The foregoing description notes a function naming convention which will now be described in detail. Each function is given a name corresponding to the instruction set it employs. In the preferred embodiment the compiler and the assembler automatically alters a user specified name to provide the object code file name. In the preferred embodiment, the functions may be written in either ARM-state or in THUMB-state. Each object code file is given a unique prefix corresponding to its state. THUMB-state functions have a dollar sign ($) prepended to the used specified name. ARM-state functions have an underscore (_) prepended to the user specified name. The veneer function for a THUMB-state function, which has an ARM instruction as its first instruction, uses the ARM-state naming convention. Additionally, the veneer function for an ARM-state function, whose first instruction is THUMB-state, uses the THUMB-state convention.

As an example, for the ARM-state function with the programmer provided name of "xyz", the compiler generates a main function "_xyz" and a veneer function "$xyz". These are listed below.

| | |
|---|---|
| _xyz: ... | ARM instruction(s) |
| $xyz: | |
| <change to ARM state> | THUMB instruction(s) |
| call _xyz | ARM instruction |

| | |
|---|---|
| <change to THUMB state> | ARM instruction(s) |
| <return to caller> | THUMB instruction |

For the THUMB-state function with the programmer provided name of "uvw", the compiler generates a veneer function "_uvw" and the main function "$uvw":

| | |
|---|---|
| $uvw: ... | THUMB instruction(s) |
| _uvw: | |
| <change to THUMB state> | ARM instruction(s) |
| call $uvw | THUMB instruction |
| <change to ARM state> | THUMB instruction(s) |
| <return to caller> | ARM instruction |

Using this naming convention scheme, a label with an underscore (_) prefix always refers to ARM code, and a label with a dollar sign ($) prefix always refers to THUMB code.

Using this naming convention each function has a native entry point in the instruction set in which it is written and a veneer function entry point in the other instruction set. It is the responsibility of the compiler to call the appropriate entry point. This naming convention makes this task trivial. The programmer provides an unrestricted function name in the same fashion as in the prior art. The compiler always stores the native object code file with a called function name according to the instruction set in which the function was compiled. The compiler also always provides for each function complied a corresponding veneer function for the other instruction sets with a name according to the naming convention for each other instruction set. For example, A function compiled in the ARM-state always calls functions using the underscore (_) prefix of the ARM-state naming convention (_xyz). The compiler prepends the underscore (_) to any function name provided by the user for a called function. Functions compiled in the THUMB-state always call functions using the dollar sign ($) prefix of the THUMB-state naming convention ($xyz) by altering the user specified name. Under this convention, whether the call is to the function itself, or to the function's veneer is transparent to the calling function and to the compiler. The compiler always generates object code files for called functions using a name having the same instruction set state as the calling function. Since every function has a corresponding veneer function, this technique assures that each such function call reaches the proper code.

Following production of the object code files, the final program is linked by a linker in a manner known in the art. The linker starts with the prime function and locates all called functions then all functions called by those called functions, continuing until all called functions are located. The linker determines the order of concatenation of the object code files as known in the art. All the function calls are resolved into references by address rather than by function name. Finally, the completed program is stored. Note that it is known in the art for a linker to omit from the linked executable object code files that are not called by other functions.

The linker used with the naming convention of this invention can be the same as known in the prior art. The linker does not need any information regarding the instruction sets employed by the various functions. The linker needs only the name of each functions, their respective lengths and the names of any functions called by each function. It is known in the art for a linker to omit inclusion of object code files that are never referenced. This is helpful to reduce the size of the final program by eliminating unused code. When employed with the naming convention of this invention, if a veneer function is never referenced the linker will omit inclusion of the veneer function from the final executable object code.

The naming convention has several advantages over the prior art. The technique of this invention employs the strengths of each part of the program development system. Program code generation is done in the compiler or the assembler. These programs are designed to generate program code, thus the additional tasks required by this invention are minimal. The linker is completely uninvolved in the process of managing state changes and needs no special knowledge of the instruction sets. The prior art linker function of omitting from the final program uncalled functions advantageously uses a known function of linkers in the new environment. Employing the naming convention of this inventions eliminates the need to examine each call instruction in the program to determine if it needs to be rewritten because it addresses program code written in another instruction set. Using the naming convention of this invention, each call is automatically correct. Lastly, the naming convention of this invention provides a program that is clearer at the assembly language level. That is, the final executable assembly language code is easier to understand than that provided by the prior art.

This application has been described in conjunction with a computer capable of operating in two independent instruction sets. Particular examples of this invention have been noted for the case of only two independent instruction sets. The naming convention of this invention can easily be applied to a computer capable of operating in more than two independent instruction sets. By selection of other prefixes, functions can easily be marked as encoded in three or more instruction sets. Note further, the naming convention need only unambiguously indicate the instruction set for which the program code is encoded. Thus the function names could be marked with predetermined suffixes postpended upon the user provided function names. Additionally, function names could be marked with predetermined infixes inserted into the user provided function names. There need only be some regular manner of altering the user provided name to mark the object code files.

The foregoing description has assumed that object code files for each function would be stored separately. It is usual in the art for separately provided object code files to be stored in the form of separate disk files. This is not necessary to practice this invention. This invention can be used in a program development system that uses separately provided object code portions which are not necessarily separately stored. It is possible for plural functions, even functions which employ differing instruction sets, to be compiled or assembled into a single object code file. If functions stored within such a combined object code file may be accessed externally, i.e. by program code outside that object code file, then the function names and locations within the object code file must be visible to the linker. In all respects the compiler or assembler operates in accordance with the description above. Each such function within a combined object code file is named according to the naming convention. The compiler or assembler produces a veneer function, named according to its instruction set, for each additional instruction set.

What is claimed is:

1. A method of producing a computer program for a computer capable of operating in a plurality of disjoint instruction sets comprising the steps of:

a) producing a plurality of independently callable functions, for each function
 1) determining a target instruction set of said plurality of disjoint instruction sets employed by said function,
 2) providing said function with a function name unambiguously indicating said target instruction set of said function,
 3) identifying within said function each call of another independent function,
 4) providing each identified call of another function within said function a calling name unambiguously indicating said target instruction set of said calling function, b) converting each function into a linkable object code module;

c) storing each linkable object code module to disk employing said function name as a disk file name;

d) generating for each function and for each instruction set other than said target instruction set a corresponding veneer function, for each veneer function
 1) providing said veneer function with a veneer function name unambiguously indicating said other instruction set,
 2) each veneer function consisting of at least one command to change the computer from operating in said other instruction set to operating in said target instruction set of said corresponding function, a call to said corresponding function in said target instruction set of said corresponding function, at least one command to change the computer from operating in said target instruction set of said corresponding function to operating in said other instruction set, a return command in said other instruction set;

e) converting each veneer function into a linkable object code module;

f) storing each veneer function linkable object code module to disk employing said veneer function name as a disk file name; and g) linking said linkable object code modules into an executable object code file of the computer program, each call to another independent function linked to either said linkable object module of a function or one of said linkable object code modules of a veneer function having a disk file name matching said calling name.

2. The method of producing a computer program of claim 1, wherein:

said step of providing said function with a function name and said step of providing each identified call of another function with a calling name each consist of modifying a user provided function name in a manner unambiguously indicating said target instruction set employed by said function.

3. The method of producing a computer program of claim 2, wherein:

said step of modifying said user provided function name consists of providing a predetermined prefix to said user provided function name, said predetermined prefix unambiguously indicating said target instruction set employed by said function call.

4. The method of producing a computer program of claim 3, wherein:

said plurality of distinct instruction sets consists of first and second distinct instruction sets; and said step of modifying said user provided function name consists of providing a prefix dollar sign ($) to said user provided function name for functions employing said first instruction set, and providing a prefix underscore (_) to said user provided function name for functions employing said second instruction set.

5. The method of producing a computer program of claim 2, wherein:

said step of modifying said user provided function name consists of providing a predetermined suffix to said user provided function name, said predetermined suffix unambiguously indicating said target instruction set employed by said function.

6. The method of producing a computer program of claim 2, wherein:

said step of modifying said user provided function name consists of providing a predetermined infix to said user provided function name, said predetermined infix unambiguously indicating said target instruction set employed by said function.

7. The method of producing a computer program of claim 1, wherein:

said step of providing said veneer function with a veneer function name consists of modifying a user provided function name of said corresponding function in a manner unambiguously indicating said other instruction.

8. The method of producing a computer program of claim 7, wherein:

said step of modifying said user provided function name of said corresponding function consists of providing a predetermined prefix to said user provided function name of said corresponding function, said predetermined prefix unambiguously indicating said other instruction set.

9. The method of producing a computer program of claim 8, wherein:

said plurality of distinct instruction sets consists of first and second distinct instruction sets; and said step of modifying said user provided function name of said corresponding function consists of providing a prefix dollar sign ($) to said user provided function name of said corresponding function for veneer functions employing said first instruction set, and providing a prefix underscore (_) to said user provided function name of said corresponding function for veneer functions employing said second instruction set.

10. The method of producing a computer program of claim 7, wherein:

said step of modifying said user provided function name of said corresponding function consists of providing a predetermined suffix to said user provided function name of said corresponding function, said predetermined suffix unambiguously indicating said other instruction.

11. The method of producing a computer program of claim 7, wherein:

said step of modifying said user provided function name of said corresponding function consists of providing a predetermined infix to said user provided function name of said function, said predetermined infix unambiguously indicating said other instruction set.

12. The method of producing a computer program of claim 1, wherein:

said step of converting each function into a linkable object code module consists of compiling a source code provided in a high level language.

13. The method of producing a computer program of claim 1, wherein:

said step of converting each function into a linkable object code module consists of assembling a source code provided in mnemonic assembly language.

14. The method of producing a computer program of claim 1, wherein:

said step of linking said linkable object code modules includes omitting from said executable object code file any functions or veneer functions not called by a function.

15. A method of producing a plurality of independently callable, linkable object code modules for a computer program for a computer capable of operating in a plurality of disjoint instruction sets comprising the steps of:

a) soliciting from a programmer a function name for each of a plurality of functions;

b) soliciting from the programmer a target instruction set of said plurality of disjoint instruction sets employed by each of said plurality of functions;

c) naming each of said plurality of functions by modifying said corresponding function name solicited from the programmer in a manner unambiguously designating said target instruction set employed by said function;

d) identifying within each of said plurality of functions any call to another of said plurality of functions;

e) providing each identified call of another function within each of said plurality of functions a calling name by modifying a programmer provided function call name in a manner unambiguously designating said target instruction set employed by said calling function;

f) converting each of said plurality of functions into a linkable object code module;

g) storing each linkable object code module to disk employing said function name as a disk file name;

h) generating for each of said plurality of functions and for each instruction set other than said target instruction set of said function a corresponding veneer function, for each veneer function 1) naming said veneer function with by modifying said corresponding function name solicited from the programmer in a manner unambiguously designating said corresponding other instruction set, 2) each veneer function consisting of at least one command to change the computer from operating in said other instruction set to operating in said target instruction set of said corresponding function, a call to said corresponding function in said target instruction set of said corresponding function, at least one command to change the computer from operating in said target instruction set of said corresponding function to operating in said other instruction set, a return command in said other instruction set;

I) converting each veneer function into a linkable object code module; and j) storing each veneer function linkable object code module to disk employing said veneer function name as a disk file name.

16. The method of producing a plurality of independently callable, linkable object code modules for computer program of claim 15, wherein:

said step of naming each of said plurality of functions by modifying said programmer provided function name consists of providing a predetermined prefix to said programmer provided function name, said predetermined prefix unambiguously indicating said target instruction set employed by said function call.

17. The method of producing a plurality of independently callable, linkable object code modules for computer program of claim 16, wherein:

said plurality of distinct instruction sets consists of first and second distinct instruction sets; and said step of naming each of said plurality of functions by modifying said programmer provided function name consists of providing a prefix dollar sign ($) to said programmer provided function name for functions employing said first instruction set, and providing a prefix underscore (_) to said programmer provided function name for functions employing said second instruction set.

18. The method of producing a plurality of independently callable, linkable object code modules for computer program of claim 15, wherein:

said step of naming each of said plurality of functions by modifying said programmer provided function name consists of providing a predetermined suffix to said programmer provided function name, said predetermined suffix unambiguously indicating said target instruction set employed by said function.

19. The method of producing a plurality of independently callable, linkable object code modules for computer program of claim 15, wherein:

said step of naming each of said plurality of functions by modifying said programmer provided function name consists of providing a predetermined infix to said programmer provided function name, said predetermined infix unambiguously indicating said target instruction set employed by said function.

20. The method of producing a plurality of independently callable, linkable object code modules for computer program of claim 15, wherein:

said step of naming said veneer function by modifying said programmer provided function name of said corresponding function consists of providing a predetermined prefix to said programmer provided function name of said corresponding function, said predetermined prefix said other instruction set.

21. The method of producing a plurality of independently callable, linkable object code modules for computer program of claim 20, wherein:

said plurality of distinct instruction sets consists of first and second distinct instruction sets; and said step of naming said veneer function by modifying said programmer provided function name of said corresponding function consists of providing a prefix dollar sign ($) to said programmer provided function name of said corresponding function for veneer functions employing said first instruction set, and providing a prefix underscore (_) to said programmer provided function name of said corresponding function for veneer functions employing said second instruction set.

22. The method of producing a plurality of independently callable, linkable object code modules for computer program of claim 15, wherein:

said step of naming said veneer function by modifying said programmer provided function name of said corresponding function consists of providing a predetermined suffix to said programmer provided function name of said corresponding function, said predetermined suffix corresponding to said other instruction.

23. The method of producing a plurality of independently callable, linkable object code modules for computer program of claim 15, wherein:

said step of naming said veneer function by modifying said programmer provided function name of said corresponding function consists of providing a predetermined infix to said programmer provided function name of said function, said predetermined infix corresponding to said other instruction set.

24. The method of producing a plurality of independently callable, linkable object code modules for computer program of claim 15, wherein:

said step of converting each function into a linkable object code module consists of compiling a source code provided in a high level language.

25. The method of producing a plurality of independently callable, linkable object code modules for computer program of claim 15, wherein:

said step of converting each function into a linkable object code module consists of assembling a source code provided in mnemonic assembly language.

* * * * *